United States Patent [19]

Dolveck

[11] Patent Number: 5,040,897
[45] Date of Patent: Aug. 20, 1991

[54] PROCESS FOR VISUALLY DETECTING A COLOR DRIFT IN A POLYCHROME REPRODUCTION

[75] Inventor: Gilbert Dolveck, St. Sorlin En Valloire, France

[73] Assignee: Swiss Aluminium Ltd., Chippis, Switzerland

[21] Appl. No.: 430,282

[22] Filed: Nov. 2, 1989

[30] Foreign Application Priority Data

Nov. 18, 1988 [CH] Switzerland ............ 4290/88

[51] Int. Cl.$^5$ .................................... G01J 3/46
[52] U.S. Cl. .................................. 356/402; 356/403
[58] Field of Search ............. 356/402, 403, 408, 423, 356/421, 422, 424

[56] References Cited

U.S. PATENT DOCUMENTS

| 1,151,395 | 8/1915 | Roberts | 356/403 |
| 1,924,747 | 8/1933 | Nickerson | 356/403 |
| 2,054,195 | 9/1936 | Forrest et al. | 356/403 |
| 2,221,916 | 11/1940 | Forrest et al. | 356/403 |
| 2,953,963 | 9/1960 | Bulkley et al. | 356/403 |

FOREIGN PATENT DOCUMENTS

3134273A1  3/1983  Fed. Rep. of Germany ...... 356/408

Primary Examiner—F. L. Evans
Assistant Examiner—K. P. Hantis
Attorney, Agent, or Firm—Bachman & LaPointe

[57] ABSTRACT

The invention relates to the printing industry, and is based on the comparison of a reproduction under inspection with a reference polychrome graphic representation. Respective reference axes ($A_1$, $A_2$) are defined for the reference representation and the reproduction under inspection. These axes are normal to and go through an equivalent point of the representation and reproduction, respectively. The two latter are rotated around their reference axes, producing whirling images ($D_1$, $D_2$) formed of concentric color rings ($a_1, a_2, \ldots a_n$ and $a'_1, a'_2, \ldots a'_n$) each having a set width and shade, and forming a basis for detecting a possible color drift.

12 Claims, 3 Drawing Sheets

PROCESS FOR VISUALLY DETECTING A COLOR DRIFT IN A POLYCHROME REPRODUCTION

BACKGROUND OF THE INVENTION

1. Field of the Invention

The present invention generally relates to printing technology and in particular to techniques used for printing a polychrome graphic representation that may, exclusively or not, comprise texts and/or illustrations that are reproduced on support media of different shapes and types. The invention more particularly relates to means for detecting a possible color drift in polychrome reproductions with respect to an original polychrome graphic representation. One particularly advantageous application of the present invention is in processes for printing a polychrome graphic representation on support media in the form of canisters, and in particular metal canisters containing various types of products.

2. Background of the Invention

In the above application, there happens to occur a color drift during the printing of successive graphic representations on the canisters. This is due, among other things, to an alteration in the shades of ink. This alteration in shades is mainly caused by temperature variations in the ink ducts in the course of the printing process and is due to various factors such as the warming of the printing machine used.

This calls for a periodic comparison between the reproductions obtained and the original graphic representation, in view of modifying the relative proportions of the inks used so as to correct for any drift in the observed shades. Up until now, this type of inspection was carried out by personnel employed to visually detect color drifts.

Not only do such inspections prove to be difficult and tiring, and call for considerable experience and visual acuity, but it also appears that color drifts are all the more difficult to detect when the graphic representation is in the form of a figure, painting or photograph showing an essentially figurative element, such as a face or landscape. Indeed, in such cases people performing the inspection tend to consider the general impression given by the reproduction and cease to observe the different shades in the details forming the figurative elements. As a consequence color drifts are only detected when they become obvious. A result of this late detection is the rejection of canisters bearing such reproductions and having shades that do not conform with those of the original representation.

It is therefore one of the aims of the present invention to overcome this drawback by providing a process for visually detecting a color drift as soon as it occurs during the course of printing an original polychrome graphic reprsentation. Another object of the invention is to provide a process that dispenses with the figurative element depicted on both the reproduction under inspection and the original representation, to show up any difference in color that may occur during the course of printing.

A further object of the present invention is to provide a process that facilitates the comparison of colors between an original graphic representation and a reproduction under inspection.

SUMMARY OF THE INVENTION

The above objects are achieved according to the invention by a process for visually detecting a color drift in a polychrome reproduction applied to a support and hereafter termed reproduction under inspection, with respect to a reference polychrome graphic representation, the process being characterized in that said process comprises the steps of: defining respective reference axes for said reference polychrome graphic representation and said reproduction under inspection, said axis respectively being normal to said reference polychrome representation and to said reproduction under inspection, and located at substantially equivalent points thereof; rotating said reference representation and said reproduction under inspection around their respective axes, thereby producing whirling images, each said whirling image being comprised of concentric colored rings each having a predetermined width and shade; comparing said thus obtained whirling images by checking for differences in said shade and/or difference in said width between said whirling images in order to discover said drift in said reproduction under inspection.

According to the invention there is also provided an apparatus comprised of a system for positioning said reference representation and said reproduction under inspection along respective axes located at substantially equivalent points thereof; means for respectively rotating said reference representation and said reproduction under inspection around their respective axes at a predetermined rotational speed so as to produce a perception that appears to be continuous to the eye.

BRIEF DESCRIPTION OF THE DRAWINGS

These and other characteristics of the invention shall be more clearly understood upon reading the following description, given as a non-limiting example, with reference to the accompanying drawings in which.

DESCRIPTION OF THE PREFERRED EMBODIMENTS

Figure 1:
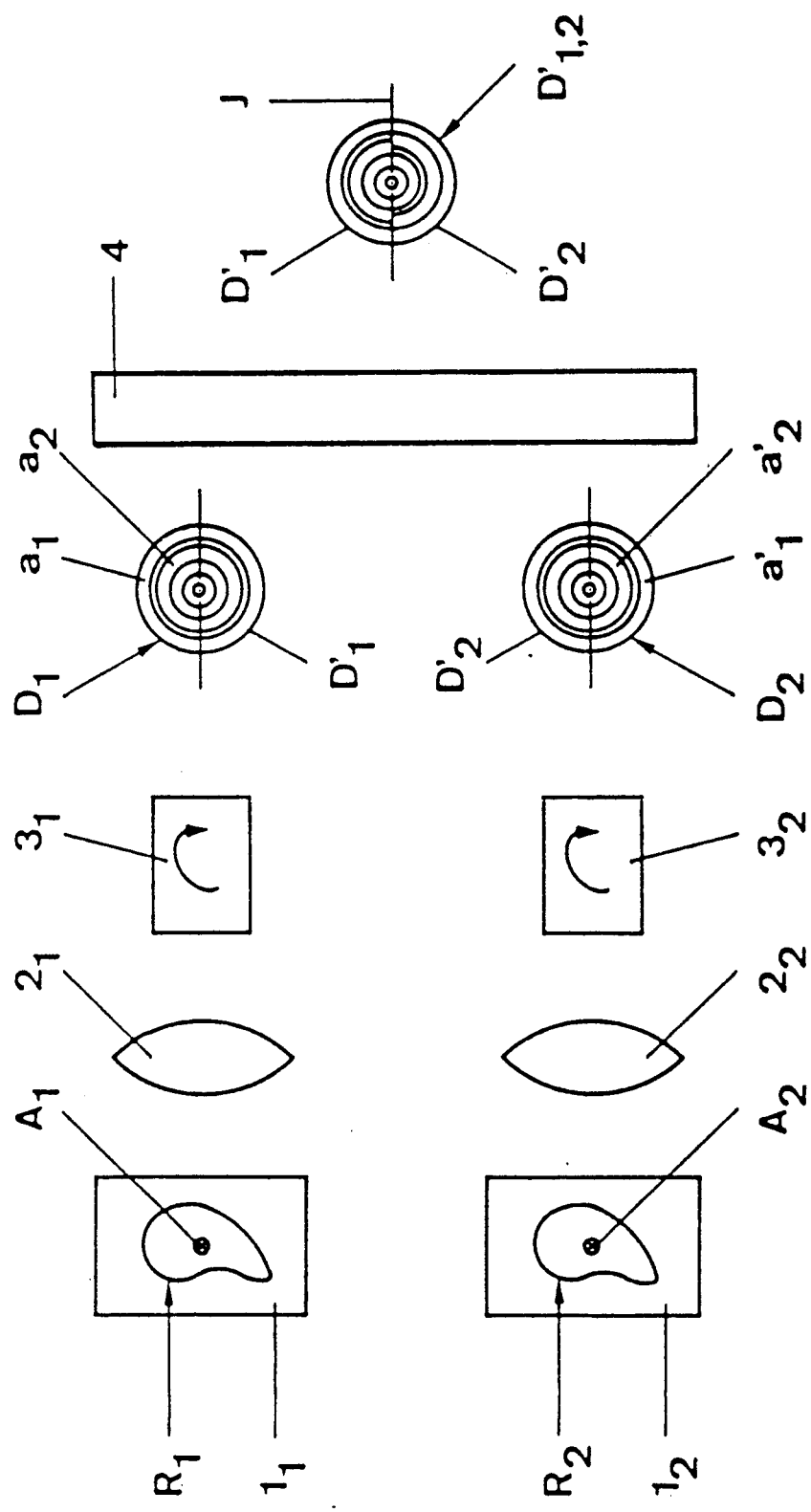
FIG. 1 is a diagram explaining the detection process according to the invention.

FIG. 1 is a schematic illustration showing the implementation of the inventive process for visually detecting a color drift in a reproduction under inspection $R_2$ applied to a support $1_2$ with respect to a reference polychrome graphic representation $R_1$ applied to a support $1_1$, where the support for the reproduction under inspection can take various forms such as a cylindrical metal canister with a circular cross-section. The term reference polychrome graphic representation is understood to encompass any representation made up, exclusive or not, of texts shown either in manuscript, printed or digitized form on the one hand and/or illustrations in the form of drawings, prints or color photographs on the other.

It should be noted that in the illustrated example the reference graphic representation $R_1$ applied to a canister $1_1$ forms a reproduction that is identical to the canister $1_2$ bearing the reproduction under inspection. However, it would obviously be possible to compare the reproduction under inspection with its original polychrome graphic representation applied to a support that is different from the canister $R_2$.

Here the term polychrome reproduction covers any reference graphic representation produced by the various standard printing methods in standard use, e.g. heliography or offset.

Figure 2:
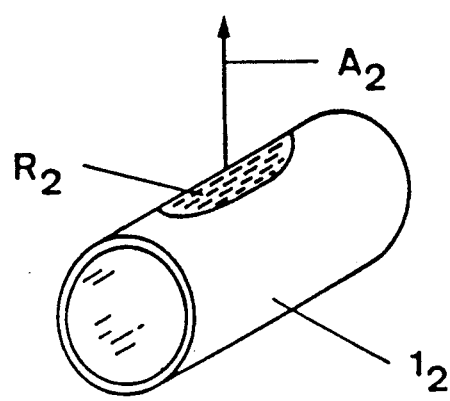
FIG. 2 is a view of a characteristic detail of the process according to the present invention.

The process according to the present invention consists in positioning each canister $1_1$, $1_2$ so that each reproduction $R_1$, $R_2$ has a respective reference axis $A_1$, $A_2$ that is normal to the support and positioned at substantially equivalent points on the reproductions (FIG. 2). In the case where the reproductions happen to be on non-planar supports, each canister $1_1$, $1_2$ is arranged to cooperate with an optical system $2_1$, $2_2$ that corrects for the depth of field in the reproductions, so as to produce substantially planar images.

The process according to the present invention next uses rotation means $3_1$, $3_2$ for rotating the respective reproductions $R_1$, $R_2$ around their reference axes $A_1$, $A_2$ at a predetermined speed so as to give a visual perception of continuity. This rotation of the reproductions $R_1$, $R_2$ produces respective images $D_1$, $D_2$ formed of colored concentric rings $a_1, a_2 \ldots a_n$ and $a'_1, a'_2, \ldots a'_n$, each having a specific width and shade as a function of the part of the reproduction to which they correspond. These images $D_1$, $D_2$ shall be referred to as whirling images but can alternatively be termed "discogrames" by virtue of their concentric color rings. The thus-obtained whirling images $D_1$, $D_2$ provide a basis for detecting a color drift in the reproduction under inspection by comparison of the different shades and/or widths of the rings $a_1, a_2 \ldots a_n$ of whirling image $D_1$ with respect to the rings $a'_1, a'_2 \ldots a'_n$ of whirling image $D_2$. Obviously, the number n of concentric rings can be identical or different between two whirling images.

The above process is particularly advantageous, especially when applied to reproductions depicting an essentially figurative element. Indeed, the rotation of the reproductions beyond the eye's image retention threshold enables the figurative element which hinders the detection of color drifts to be abstracted. The person carrying out the inspection thus concentrates his/her attention only on the rings that form standard images.

The two whirling images $D_1$, $D_2$ can of course be photographed for subsequent processing. It should also be noted that the reproductions $R_1$, $R_2$ are adequately illuminated prior to their setting into rotation, to ensure suitable visual inspection conditions.

To facilitate the detection of color drifts, the process according to the invention further provides the use of a system 4 for adjacently positioning respective halves $D'_1$, $D'_2$ of the whirling images along their diameters thereby producing a resultant whirling image $D'_{1,2}$. The two halves of the complementary whirling images are thus located adjacent to each other along their diameters, defining a junction line J serving to highlight any difference in the width and/or shade between the rings of the respective whirling images.

The process according to the present invention can further involve superimposing the fixed image of the reproduction under inspection $R_2$ on its associated whirling image $D_2$ so as to help determine the relation between the colored rings and the corresponding portions of the reproduction.

The resulting whirling image can be photographed for subsequent processing. Moreover the whirling images $D_1$, $D_2$ as well as the resultant whirling image $D'_{1,2}$ can be viewed through color filters having predetermined characteristics.

Figure 3:
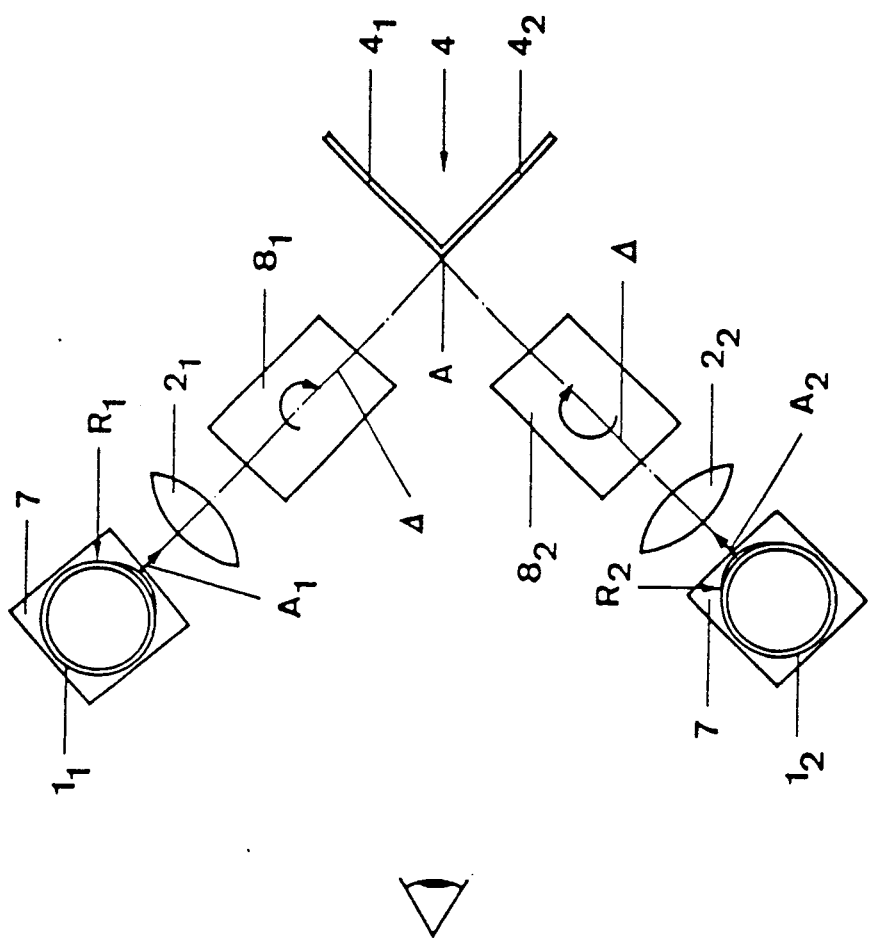
FIG. 3 is a view of an embodiment of an apparatus for implementing the inventive process.

FIG. 3 shows an example of an apparatus used for implementing the process according to the present invention. For each of the two canisters, the apparatus comprises a system 7 for positioning reproductions along respective reference axis $A_1$, $A_2$ that are normal to the canisters $1_1$, $1_2$ and go through equivalent points in each of the two reproductions. As an example, a precision of 0.1 to 0.3 mm is sufficient for the relative positioning of the two axes.

Figure 4:
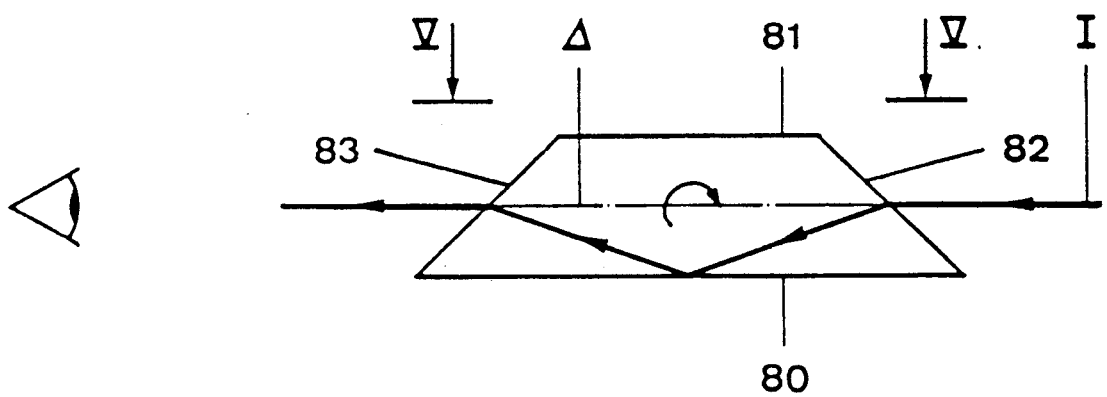
FIG. 4 is a view of a characteristic feature of the apparatus according to the invention.
Figure 5:
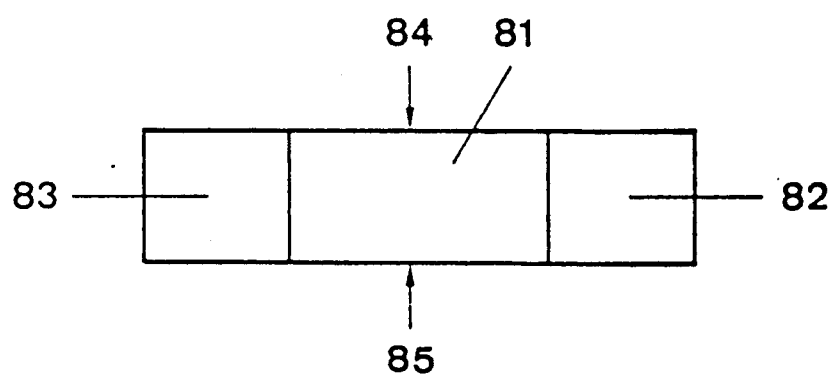
FIG. 5 is a plan view along the line V—V of FIG. 4.

Each reproduction $R_1$, $R_2$ is associated with an optical system $2_1$, $2_2$ for depth of field correction and which is placed in association with rotational means $8_1$, $8_2$ for rotating the reproductions. The above means $8_1$, $8_2$ can be comprised of a DOVE prism, as in the illustrated example. As is shown more clearly in FIG. 4, the cross-section of such a prism has the shape of an isosceles trapezium having a major base 80 from which extends, up to a minor base 81, an input face 82 and an output face 83. The prism also has two lateral faces 84 and 85. The input and output faces 82, 83 as well as the major base, have polished surfaces while the two lateral faces 84, 85 and the minor base 81 have matt surfaces. FIG. 4 shows the path of a light ray I entering along the optical axis of the prism, which is advantageously placed coaxially with the reference axis of a reproduction. By rotating the prism around its optical axis $\Delta$, it is possible to produce an image on the output face that rotates twice as fast as the prism itself. If the rotational speed of the prism is selected so as to provide a visual perception of continuity the image produced corresponds to a whirling image as defined above. The rotational speed of the prism can, for example, be equal to 12 revolutions per second.

Obviously, any other rotational means may be used. For example, a rotational device supporting a canister or the reproduction and having a rotation axis in line with the reference axis may also be used. The rotational speed of the rotating element can in such cases be set to e.g. 24 revolutions per second.

The rotational means $8_1$, $8_2$ are placed in relation with an optical system 4 that allows the two complementary halves of the respective whirling images to be viewed adjacent to each other along their diameters. Such an optical system can e.g. be comprised of two mirrors $4_1$, $4_2$ intersecting each other at 45° and placed on the optical path of a respective whirling image. The mirrors can then be viewed with reference to their common edge A to observe either the two whirling images $D_1$, $D_2$ in full or the two complementary halves of these whirling images located adjacent to each other along their diameter. The latter alternative is achieved by placing the common edge at the intersection of the two respective optical axes $\Delta$, as shown in FIG. 3.

The invention is not limited to the above described examples, and other modifications can be brought thereto without departing from the scope of the invention.

I claim:

1. A process for visually detecting a color drift in a polychrome reproduction under inspection applied to a support with respect to a reference polychrome graphic representation which comprises:

defining respective reference axes for said reference polychrome graphic representation and said reproduction under inspection, said axes respectively being normal to said reference polychrome representation and to said reproduction under inspection, and located at substantially equivalent points thereof;

rotating said reference representation and said reproduction under inspection around their respective axes, thereby producing two whirling images, each said whirling image being comprised of concentric colored rings each ring having a predetermined width and shade; and comparing said thus-obtained whirling images by checking for differences between said whirling images in order to discover color drift in said polychrome reproduction under inspection with respect to said reference polychrome graphic representation.

2. A process according to claim 1 wherein said whirling images are checked for differences selected from the group consisting of differences in shade, differences in width and mixtures thereof.

3. A process according to claim 1 further comprising the step of detecting said color drift with respect to a reference polychrome graphic representation formed by an original polychrome graphic representation.

4. A process according to claim 1 further comprising the step of detecting said color drift with respect to a reference polychrome graphic representation formed by a reference reproduction applied on a support that is identical to that bearing the reproduction under inspection.

5. A process according to claim 1 further comprising the step of adjacently positioning respective halves of said whirling images along the diameters thereof, thereby producing a resultant whirling image having a junction line, and comparing differences between corresponding rings of said halves of said whirling images.

6. A process according to claim 5 further comprising the step of superimposing said reproduction under inspection on said whirling image corresponding thereto.

7. A process according to claim 1 further comprising the step of photographing said whirling images for subsequent processing.

8. A process according to claim 5 further comprising the step of photographing said whirling image having a junction line for subsequent processing.

9. A process according to claim 1 further comprising the step of visually detecting color drifts between said whirling images through a filter.

10. A process according to claim 5 further comprising the step of visually detecting color drifts in said whirling image having a junction line through a filter.

11. A process according to claim 1 further comprising the step of illuminating said reproduction under inspection and said reference polychrome graphic representation prior to their rotation.

12. A process according to claim 1 further comprising the step of correcting for the depth of field of said reproduction under inspection and said reference polychrome graphic representation when applied on a nonplanar support prior to their rotation.

* * * * *